July 7, 1970  T. DOMBROWSKI ET AL  3,518,914
SENSING APPARATUS FOR SETTING A TOOL FOR TRUING A WHEEL
Filed Nov. 27, 1967  6 Sheets-Sheet 2

INVENTORS

United States Patent Office 3,518,914
Patented July 7, 1970

3,518,914
SENSING APPARATUS FOR SETTING A TOOL FOR TRUING A WHEEL
Theodor Dombrowski and Max Luzina, Erkelenz, Germany, assignors to Wilhelm Hegenscheidt Kommanditgesellschaft, Erkelenz, Germany
Filed Nov. 27, 1967, Ser. No. 685,799
Claims priority, application Germany, Nov. 26, 1966,
H 61,111
Int. Cl. B23b 5/28
U.S. Cl. 82—8                                       11 Claims

ABSTRACT OF THE DISCLOSURE

A lathe for truing railroad wheels has a cutting tool mounted on carriage means. In order to automatically set the tool to an operative position for cutting worn off surfaces of the wheel, feeler means are mounted on the carriage means and open switch means to stop the motors of the carriage means, and thereby the carriage means with the tool when the same is in the desired operating position.

BACKGROUND OF THE INVENTION

Railroad wheels which have an annular rolling surface and a wheel flange on one side, are differently worn off along surface portions of the rolling surface and of the wheel flange. In some wheels, the surface of the wheel flange, and in other wheels the rolling surface, is more worn. Furthermore, pairs of railroad wheels are mounted on a common axle and form a wheel set, and frequently one wheel of the pair is differently worn off than the other. Such wheels are machined by a cutting tool in an automatic lathe controlled by a template having the desired contour of the peripheral wheel surfaces. Partly worn off annular peripheral surfaces of the railroad wheel are machined until they are again exactly circular. The diameter of the new machined peripheral surface required by the particular degree of wear of the respective railroad wheel, cannot be exactly determined by conventional measuring devices. Furthermore, 1 mm. wear of the wheel flange corresponds to approximately 2 mm. wear of the rolling surface, so that the amount of wear of the wheel flange must be particularly considered in order to prevent more metal being taken off the wheel than necessary for making the worn-off wheel serviceable again.

The different amount of wear of different surface portions, together with the required contour of the wheel periphery, cause great difficulties in measuring the wheels for the purpose of properly truing the same. Since a reliable measuring can hardly be obtained, it is general practice not to measure the worn wheel at all. The lathe operator "senses" the worn peripheral surface with the cutting tool while the wheel is rotated, and accordingly adjusts the position of the tool to cut off a chip of the required depth. Usually, the chip which is taken off is too large, since the operator prefers to cut a single chip along the entire peripheral contour of the wheel. As a result, valuable and irreplaceable material is cut off the wheel.

It has been proposed to use optical and electronic measuring devices for determining the greatest possible diameter to which a worn-off wheel can be cut, but since the measuring operation is carried out by an operator, the result must be used for manually setting the tool supporting carriages of the lathe on which wheel sets are machined.

SUMMARY OF THE INVENTION

It is one object of the invention to overcome the disadvantages of known arrangements for truing wheels, particularly railroad wheels and railroad wheel sets.

Another object of the invention is to provide a sensing apparatus for sensing the peripheral contour of a worn wheel, and to set the carriage means of the lathe, and thereby the tool thereon, to a position in which the wheel can be economically and accurately trued by the tool.

Another object is to provide feeler means on the tool carriage means which open switches in the circuit of the motor driving the carriage means when sensing the wheel, so that the carriage means stop in the correct position in which the turning operation of the tool can be started.

Another object of the invention is to automatically sense the worn peripheral surface portions of the wheel while the same rotates, and to automatically set the tool to a position in which the most worn off surface portion is machined by the tool to have again a precisely circular shape.

With said objects in view, the present invention relates to a sensing apparatus for setting a tool in an operative position for truing a worn peripheral surface or a rotating wheel, particularly of a railroad wheel having a rolling surface and a wheel flange along the periphery thereof.

One embodiment of the invention comprises carriage means movable toward and away from the wheel, and preferably including a carriage movable in axial direction; tool means mounted on the carriage means; feeler means mounted on the carriage means in a predetermined relative position in relation to the tool means so that the same is in the operative position when the feeler means senses a worn off part of the peripheral surface of the wheel while the same is being rotated; motor means for moving the carriage means until the feeler means senses the peripheral surface and is actuated by uneven parts of the same; and electric circuit means connected with the motor means and including switching means operated by the actuated feeler means to stop the motor means. Thereby, the carriage means is stopped with the tool means, and due to the predetermined relative position between the sensing means and the tool means, the tool means is set in the operative position when the carriage means stop.

Thereupon, the feeler means are moved to an inoperative position, and the motor means operate the carriage means to move the tool means under the control of the ing wheel until the peripheral surfaces, particularly the template over the worn peripheral surfaces of the rotating wheel until the peripheral surfaces, particularly the rolling surface and the wheel flange surface, are again exactly circular.

The carriage means is first operated by a motor to move a flange feeler into engagement with the unworn circular rim surface at the extremity of the wheel flange. Thereupon, another motor operates a carriage to move in axial direction of the wheel until another feeler engages a lateral surface of the wheel adjacent the wheel flange. Since the axial position of the wheel cannot be exactly determined, the flange feeler is preferably a roll elongated in axial direction of the wheel so that it engages the wheel flange rim in axially displaced positions of the wheel.

When the position of the tool means has been roughly determined by the flange feeler and the lateral feeler, another mortor operates a carriage supporting third and fourth feelers which respectively sense the worn rolling surface and the worn wheel flange surface of the wheel. When the carriage is in a position in which the most worn parts of the wheel surfaces are sensed by the third and fourth feelers, the same are displaced by the uneven parts of the peripheral surfaces of the rotating wheel so that corresponding switches are opened and the motor driving the carriage is stopped. The tool is now in the exact position for truing the peripheral surfaces of the wheel.

For moving the flange feeler toward engagement with the wheel flange rim, a highspeed rapid advance motor is used which is automatically switched off by the flange feeler sensing the wheel flange rim which is exactly circular since it is not worn off by use of the wheel. Consequently, independently of the amount of wear of the wheel, the carriage means are advanced toward the wheel at high speed to an initial position from which further movements of the carriage means can be started at a lower speed for sensing the worn off parts by other feelers. The distance which the carriage means have to move at low speed is comparatively short.

The axial position of a wheel set in relation to the carriage means can be quite different since wheels whose wheel flanges are worn off have a greater lateral play on the rails, and can roll into the machine in a laterally displaced position. Unequal centering bores may also cause a lateral displacement of the wheel set. Therefore, it is advantageous to use an axially elongated roller for the wheel flange feeler so that the wheel flange rim is engaged by the same in any axially displaced position of the wheel or wheel set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
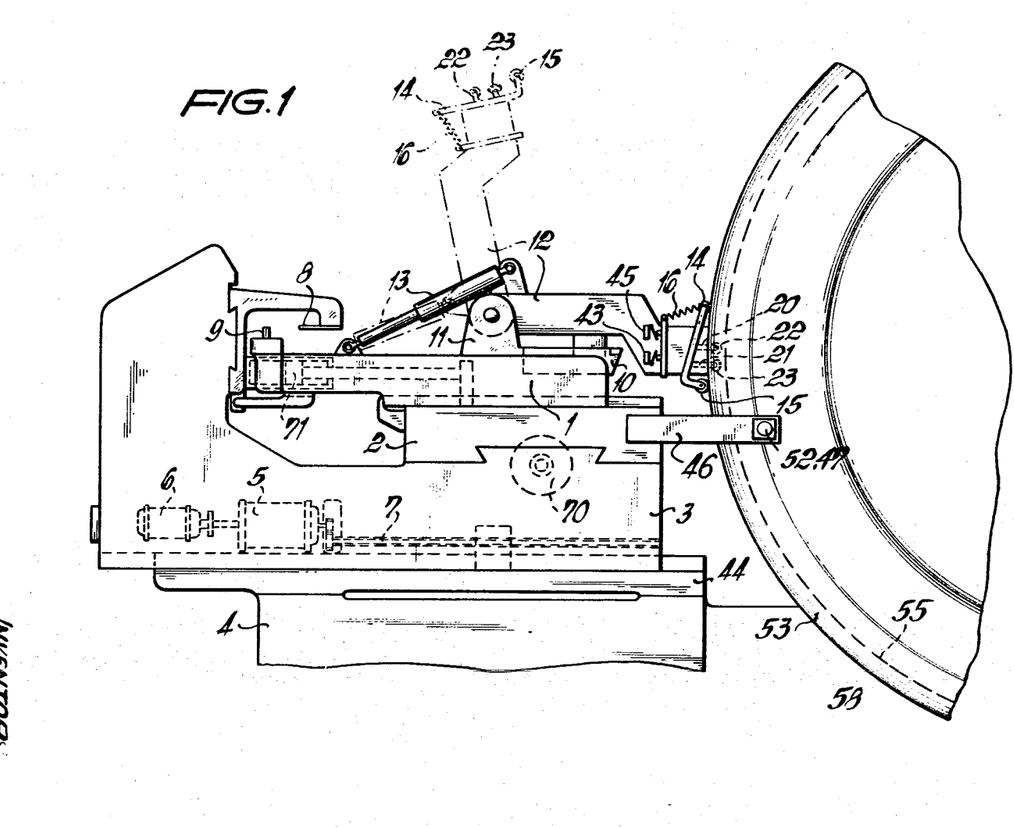
FIG. 1 is a fragmentary elevation illustrating an embodiment of the invention provided in an automatic, template controlled lathe for truing railroad wheels.
Figures 2, 7:
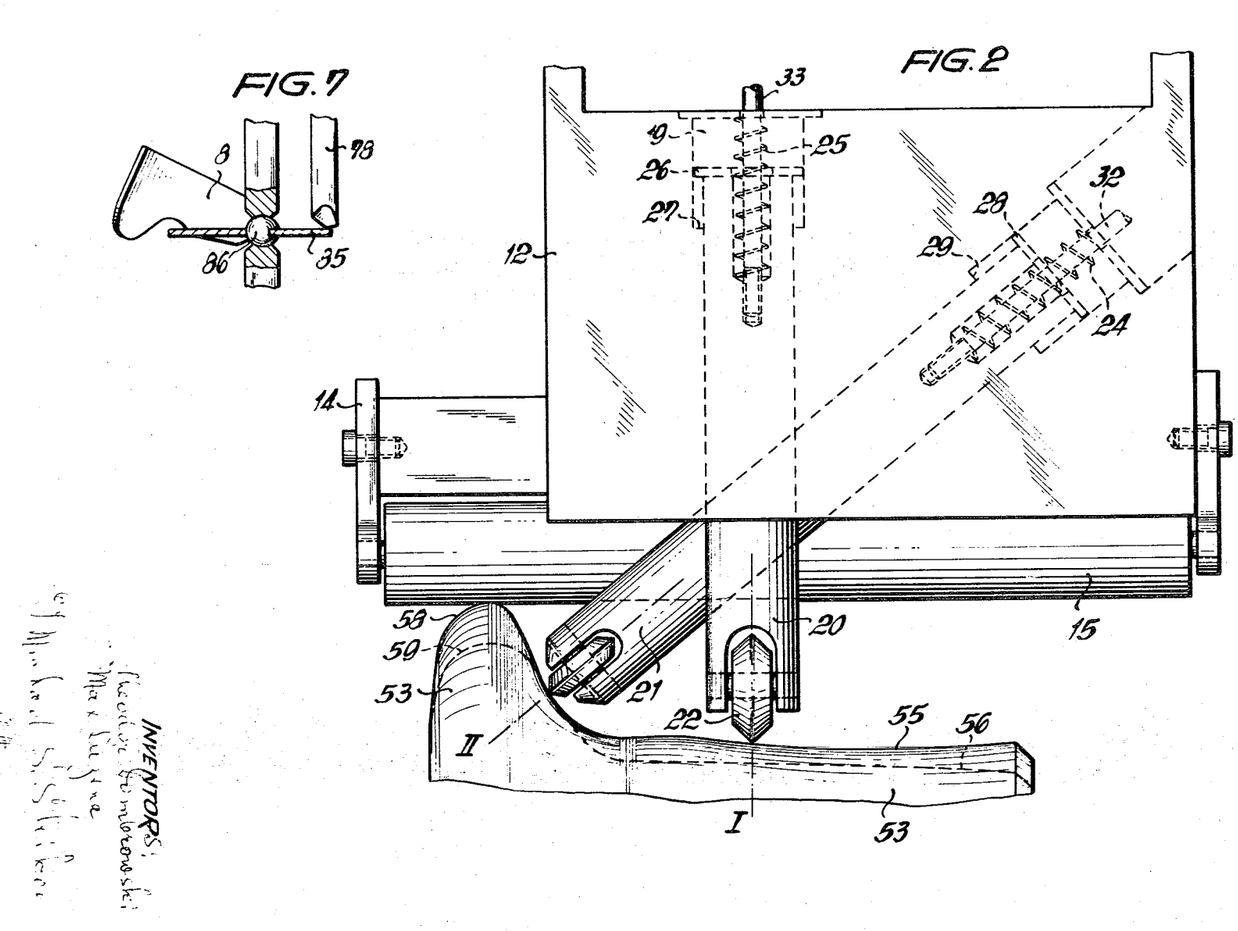
FIG. 2 is a fragmentary plan view illustrating a feeler support of the embodiment of FIG. 1 with three feelers shown in a sensing position engaging the peripheral surface of a railroad wheel.
FIG. 7 is a fragmentary schematic perspective view illustrating a modification of the apparatus of FIG. 6 corresponding to the schematic illustration of FIG. 1.
Figure 3:
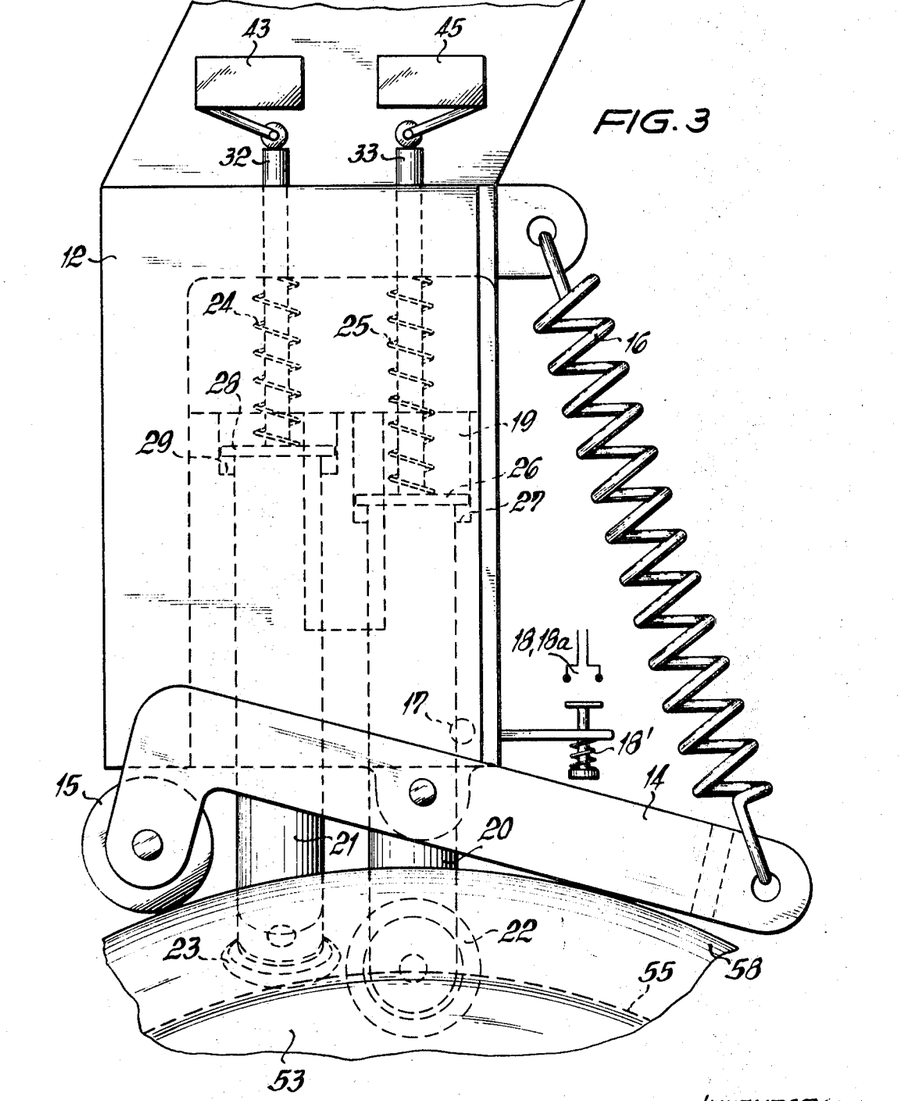
FIG. 3 is a fragmentary side view of the feeler supports and feelers shown in FIG. 2.

Referring now to the drawings, and more particularly to FIGS. 1 to 3, a railroad wheel 53 having a peripheral rolling surface portion 55 and a peripheral wheel flange 58, is mounted for rotation about its axis by means, not shown, forming part of a lathe. The lathe has a bed 4 with a transverse guide means 44 on which a main carriage 3 is mounted for movement toward and away from wheel 53. A carriage 2 is mounted on carriage 3 for movement in axial direction of the wheel, and supports a tool carriage 1 on which a tool 10, shown to be cutter, is mounted. A high speed rapid advance motor 5, and a low speed motor 6 are operatively connected with a spindle 7 engaging a nut secured to main carriage 3 so that carriage means 3, 2, 1 can be moved together at a high speed, or at a low speed toward and away from the wheel. A hydraulic motor motor 70, see FIGS. 1 and 6, has a piston rod connected with carriage 2 to move the same in axial direction so that by operation of motor 70, carriages 2 and 1 are displaced parallel to the axis of wheel 53. A hydraulic motor 71, see FIGS. 1 and 6, has a piston rod connected with carriage 1 so that motor 71 moves tool carriage 1 toward and away from the wheel. A template 8 has a contour, see FIG. 6, corresponding to the desired contour 56, 59 of the peripheral surface of wheel 53, as best seen in FIG. 2. A sensing means 9, schematically shown in FIG. 1, cooperates with template 8 when motors 70 and 71 operates slides 1 and 2 so that cutting tool 10 machines a new exactly circular peripheral surface 56, 59 by turning off the worn surface portions 55 and 58. This arrangement will be described in greater detail with reference to FIG. 6, but is not an object of the invention.

In order to properly place the tool 10 in relation to the peripheral surface of the wheel, the sensing apparatus of the present invention provides a feeler support 12 mounted for angular movement in bearing means 11 which are secured to the tool carriage 1. Feeler support 12 carries a control feeler 21 having a feeler roller 23 cooperating with an annular peripheral surface of wheel flange 58, a control feeler 20 having a feeler roller 22 cooperating with the rolling surface 55 of the wheel, and a positioning feeler 14 having a feeler roller 15 cooperating with the annular rim at the outer extremity of the wheel flange 58 which is not worn by use of the wheel on rails, and which is consequently exactly circular, while surface portions of the rolling surface 55 and of the wheel flange are at least partly worn off.

When feeler support 12 is in the operative position shown in solid lines in FIG. 1, feelers 20, 21 and 14 are operative, but feeler support 12 and the feelers thereon can be turned to the position shown in broken lines in FIG. 1 by a small hydraulic motor 13 articulated to carriage 1 and feeler support 12. When feeler support 12 is retracted to this inoperative position, slide 1 with tool 10 can be advanced to operate on the peripheral surface of wheel 53.

As best seen in FIGS. 2 and 3, a pair of levers 14 is mounted on opposite sides of feeler support 12, and positioning feeler roller 15 is mounted between levers 14 and has a substantial length in axial direction thereof and of the wheel 53 so that irrespective of the axial position of the wheel, feeler roller 15 can engage the rim of wheel flange 58. As best seen in FIG. 3, at least one spring 16 connects the end of a lever 14 with an eye secured to feeler support 12 so that feeler roller is biased toward the wheel flange.

Feelers 21 and 20 are mounted for longitudinal movement in corresponding bores of feeler support 12. Feeler 20 is guided for movement in a plane I substantially perpendicular to the wheel axis, and feeler 21 is mounted for movement in a plane II perpendicular to a tangent on the inner peripheral surface of wheel flange 58. Due to the fact that the wheel flange surface and the rolling surface 55 are worn off, feelers 20 and 21 will be displaced in the respective bores of feeler support 12. A spring 24 abutting an abutment of feeler support 12 and also a flange 28 on feeler 21, urges the latter to a position in which flange 28 abuts an annular abutment shoulder 29 of the respective bore in feeler support 12, but when the wheel flange surface is engaged by roller 23, feeler 21 is pushed back against the action of the spring, and displaces a rod 32 which operates an actuating arm of a switch 43, as best seen in FIG. 3. A spring 25 abutting feeler support 12 and also a flange 26 of feeler 20 urges the same to a position in which flange 26 rests on an annular abutment shoulder 27. When feeler roll 22 abuts rolling surface 55 of the wheel, feeler 20 is pushed back against the action of spring 25, and the rod 33 of feeler 20 displaces the actuator arm of switch 45.

Figure 4:
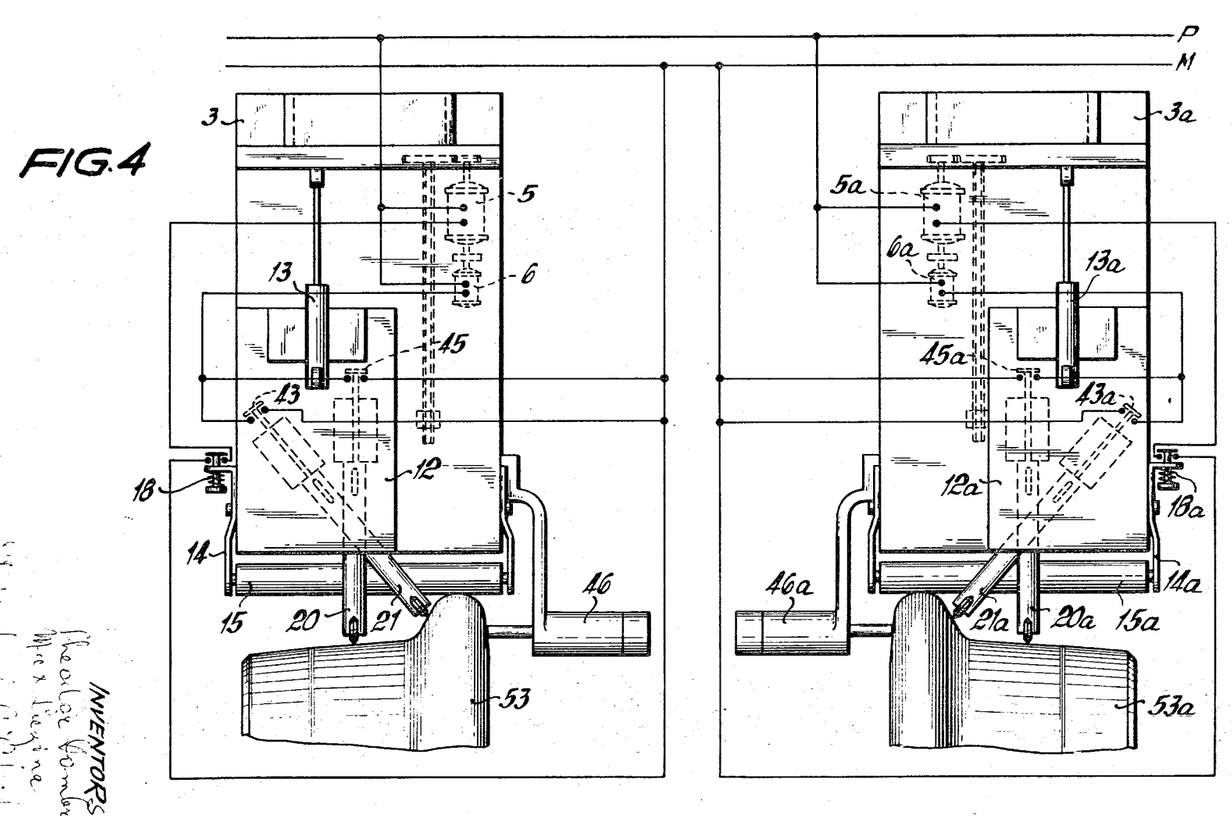
FIG. 4 is partly a schematic plan view, and partly a circuit diagram illustrating an embodiment of the invention for simultaneously but independently sensing the peripheral surfaces of the two wheels of a wheel set.
Figure 5:
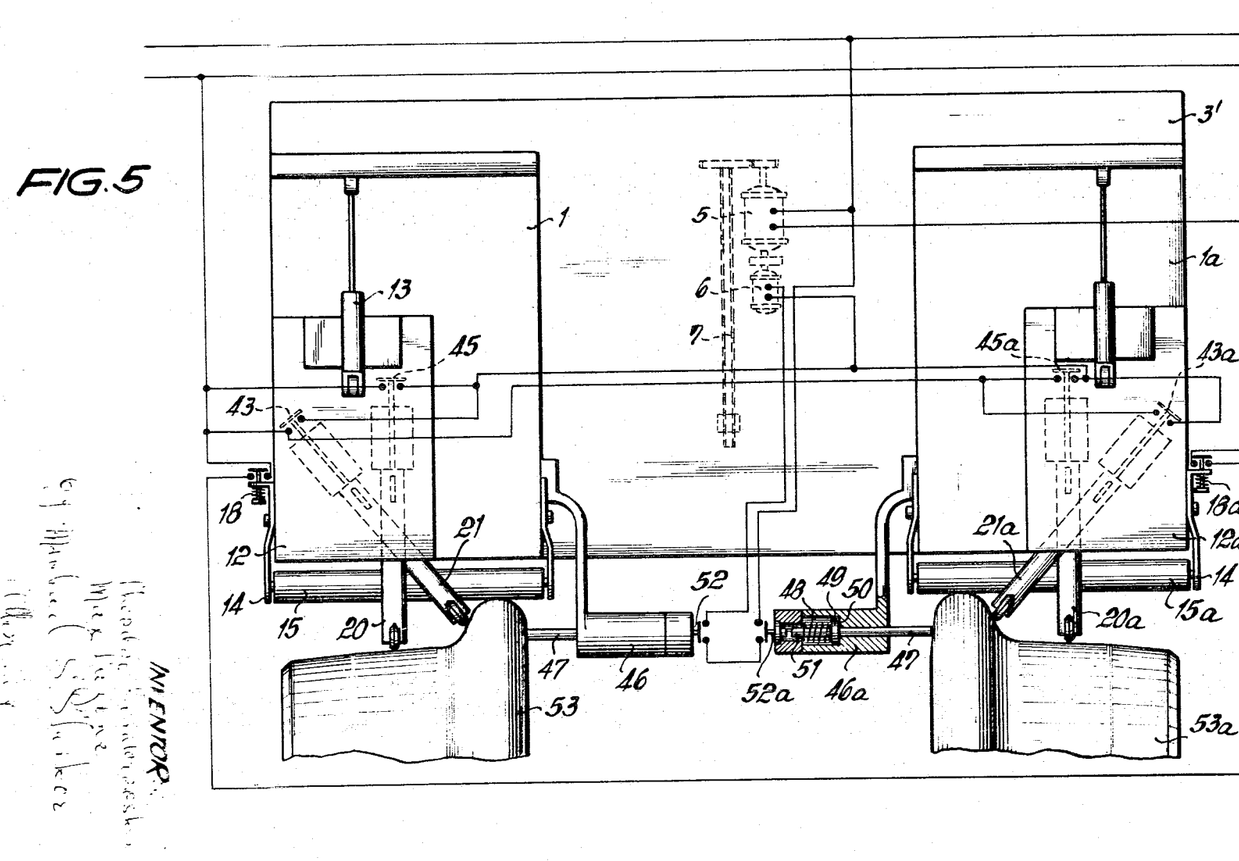
FIG. 5 is partly a schematic plan view, and partly a circuit diagram illustrating another embodiment of the invention for simultaneously sensing the peripheral surfaces of the two wheels of a wheel set, and having a common carriage.

The above described parts are also shown in the left portion of FIGS. 4 and 5, and corresponding parts indicated by the same reference numerals with the subscript *a* are shown in the right portion of FIGS. 4 and 5. The arrangement is shown duplicated in FIGS. 4 and 5 for simultaneously working on the two wheels 53 and 53*a* of a wheel set which also includes an axle permanently secured to wheels 53 and 53*a*.

As best seen in FIGS. 1 and 5, an arm 46, or 46*a*, is secured to the second axially movable carriage 2 and supports a lateral feeler 47 which cooperates with a lateral surface on one side of the wheel flange of the wheel. A spring 48 urges feeler 47 to a position in which its flange 49 abuts an annular shoulder 50, but when motor 70 moves carriage 2 with support 46 in axial direction, feeler 47 abuts wheel 53 and is displaced so that its rod 51 engages the actuator of the switch 52 and operates the same.

In the embodiment of FIG. 4, a high speed motor 5 and a low speed motor 6 are provided for moving carriage 3 at high or low speed toward the wheel 53. Corresponding high speed and low speed motors 5*a* and 6*a* are provided for moving carriage means 3*a* at high or low speed toward wheel 53*a*. In the embodiment of FIG. 5, where carriage 3′ is common to carriages 1, 2 and 1*a*, 2*a*, a single high speed motor 5, and a single low speed motor 6 are provided for moving the common carriage 3′ at different speeds.

FIGS. 4 and 5 show the circuits by which the several feeler operated switches are connected with the motors by which the carriages are operated. A voltage source having terminals P and M is provided. In the embodiment of FIG. 4, one terminal of motors 5, 6, 5*a*, 6*a* is connected to terminal P, and the respective other terminals of motors 5 and 5*a* are connected over switches 18 and 18*a*, respectively, with the terminal M. The respective other terminals of motors 6 and 6*a* are connected with the terminal M by two parallel lines, one of which includes switches 45 and 45*a*, and the other of which includes switches 43 and 43*a*.

In the embodiment of FIG. 5, the single high speed motor 5 is connected with terminal P and its other terminal is connected over switch 18*a* with terminal M. One terminal of motor 6 is connected through switch 52 with the terminal P, and the other terminal of motor 6 is connected over parallel switches 45, 43 and 45*a*, 43*a* to terminal M.

Figure 6:
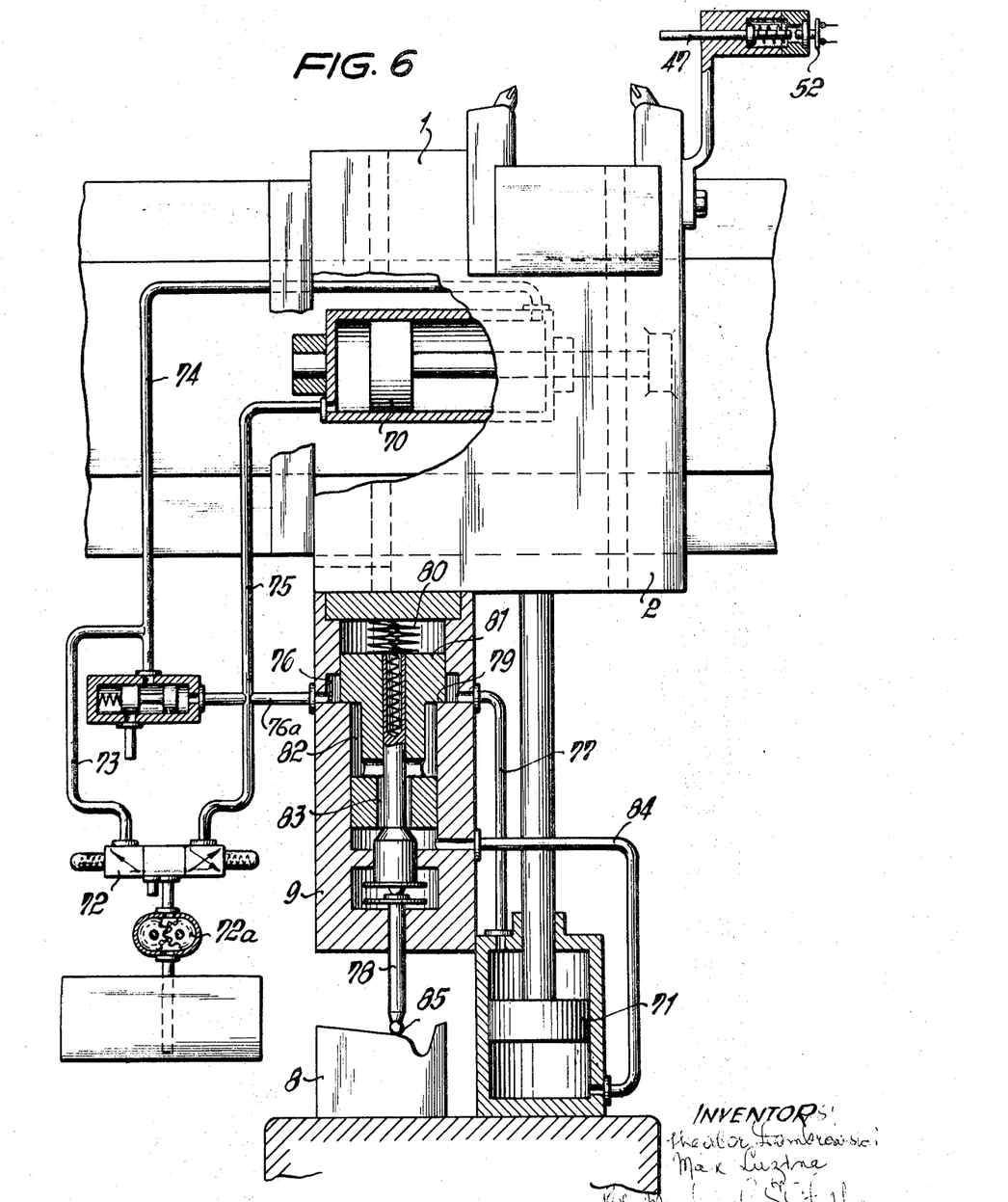
FIG. 6 is a fragmentary schematic plan view, partially in section, illustrating the operation of the carriage means under the control of a template.

Switches 52 and 52*a* are also connected to motor 70 for stopping carriage 2, and as shown in FIG. 6, motor 70 is a hydraulic motor controlled by a magnetic valve 72 controlled by switches 52 or 52*a*.

FIG. 6 illustrates the drive of the tool slide by performing a turning operation under the control of the template, and shows the hydraulic motor 71 for moving carriage 2 in axial direction of the wheel, hydraulic motor 70 for moving the tool slide 1 toward and away from the wheel, the template 8, and the sensing means 9 including a sensing member 78 acting on a double-armed lever 85 supported in a bearing 86 and having a free end following the contour of template 8, as best seen in FIG. 7. Sensing means 9 is shown in FIG. 6 in section and, for the sake of clarity, turned 90° out of its normal position.

A magnetic valve 72 which is controlled by switches 52 or 52*a*, controls the flow of pressure oil supplied by a pump 72*a* into conduits 73, 74 and 75. When pressure oil flows through conduit 73, 74 into the cylinder space behind the piston of hydraulic motor 70, carriage 2 is moved parallel to the axis of the wheel until feeler 47 abuts the lateral face of the wheel 53 and operates switch 52 which shifts the magnetic valve 72 so that pressure oil flows through conduit 75 which supplies the pressure oil behind the large end face of the piston of hydraulic motor 70 and also through conduit 76*a* into the annular chamber 76 of sensing means 9 and into conduit 77 so that the piston of hydraulic motor 71 is operated and the sensing members 78, 85 are moved into contact with the template 8 and the cutting operation is started. The oil discharged from the hydraulic motor 70 flows through conduit 74 to the pressure valve 79 whose piston is subjected to the pressure in conduit 75. The sensing member 78, 85 of the sensing means 9 follows the contour of the template 8, and the carriage 1 follows such movement with the tool. When sensing member 78, 85 is pressed into the housing of sensing means 9 by a rising contour of the template, the sealing edge 79 of piston 81 rises against the action of spring 80, and the pressure oil flows through conduits 82 and 83 into conduit 84 and behind the piston of hydraulic motor 71. Both sides of the piston are now subjected to the pressure, and the piston moves forward due to the greater pressure on the free piston end face. Consequently, the raising of piston 81 with sealing edge 79 by feeler member 78, 85 effects a reversal of the hydraulic motor 71 and of carriage 1 since in one direction of movement, the piston of hydraulic motor 71 is subjected to pressure only on one side, and in the other direction of movement, the differential pressure between the circular and annular piston faces causes the movement.

Sensing rod 78 can directly operate on the contour, but such an arrangement would be reversed as compared with the showing of FIG. 1, and consequently the double-armed lever 85 is interposed according to FIG. 7 between sensing member 78 and template 8.

OPERATION

Before any operation, the tool carriage 1, and the main carriage 3 are retracted to inoperative positions. Carriage 2 is in an end position in which feeler 74 is spaced from the lateral surface of wheel 53 adjacent the wheel flange. Feeler support 12 is now turned from the inoperative position shown in broken lines in FIG. 1 to the operative position in which feelers 20, 21 and 15 are located opposite the wheel 53. If two wheels of a wheel set are simultaneously repaired, the same operations are simultaneously carried out with the tool supports 12 and 12*a* shown in FIGS. 4 and 5.

Rapid advance motor 5 is started to move carriages 3, 2 and 1, together with feeler support 12 and feeler 46 rapidly toward the wheel until feeder roller 15 on feeler levers 14 engages the unworn circular rim along the extremity of the wheel flange 58. Due to the axial length of feeler roller 15, the engagement is assured irrespective of the axial relative position between feeler support 12 and carriage 1 and wheel 53.

When feeler roller 15 engages the extremeity of the wheel flange, levers 14 are turned in clockwise direction against the action of spring 16, as best seen in FIG. 3, and the spring loaded actuator 18′ of switch 18 or 18*a* is released and opens switch 18 so that the high speed motor 5 is stopped together with the carriage means 3, 2, 1.

Motor 70 is now started which can be accomplished by a contact of switch 18 so that carriage 2 is moved in axial direction toward the wheel until feeler 47 engages the lateral face of wheel 53 and is pressed back against the action of spring 48 to close contact 52, or 52*a*, which stops hydraulic motor 70 by acting on the hydraulic valve 72. Consequently, tool slide 1 is now in the correct axial and radial position in relation to the wheel, and feelers 20 and 21 are correctly placed to sense the worn-off rolling surface 55 and a surface portion of wheel flange 58, as best seen in FIG. 2. If necessary, more than one feeler 20 for the rolling surface 55, and more than one feeler 21 for the wheel flange surface can be provided.

Switches 50 or 52*a* do not only start the movement of carriage 2, but also start the low speed motor 6 so that tool carriage 1 with feelers 20 and 21 moves toward the peripheral surface of wheel 53 until feeler rollers 22 and 23 abut the worn peripheral surface as shown in FIG. 2. During a further movement of carriage 1, the flanges 26 and 28 separate from the annular abutment 27 and 29 against the action of springs 25, 24 depending on the amount of worn off material of the peripheral wheel surface so that switches 43 and 45 are operated. During this operation, wheel 53 is rotated so that the feelers can be in contact with the most worn part of the rolling surface 55 and the wheel flange 58.

The actuated switches 43 and 45 disconnect and stop the low speed motor 6 since carriage 1, feeler support 12, and tool 10 are now in the correct position. The relative position between tool 10 and feeler means 20 to 23 is selected that, when the feelers are in the position sensing the worn off parts of the peripheral wheel surface, the tool is properly placed for cutting the new contour 56, 59 of the wheel in accordance with template 8. For turning the periphery of the wheel, feeler support 12 is turned back to the position shown in broken lines in FIG. 1, and motors 70 and 71 are operated, as described with reference to FIG. 6, to bring the sensing means 9 into contact with template 8 whereupon the contour 56, 59 of the wheel is accurately produced. Consequently, the accurate setting of the tool is automatically effected by feeler means 20, 21, 15, 47 which have a predetermined relative position to the tool 10 and template 8.

The above description of an operation is applicable to each of the two sensing devices shown in FIGS. 4 and 5 for simultaneously machining the worn off peripheral surfaces of the two wheels 53, 53a of a wheel set. If only small chips having a depth of one or two millimeters are to be taken off, both tool supports can be provided with the sensing apparatus of the invention and independently operated. Small differences of the diameter generally fall within the range of permissible tolerances. If a greater accuracy is required, particularly for wheel sets to be used on high speed trains, instead of two main carriages 3, a common main carriage 3' is provided for supporting two carriages 2 on which two carriages 1 are mounted, as shown in FIG. 5. In such a construction, only one high speed motor and one low speed motor is required for moving the common main carriage 3'. In the modified arrangement of FIG. 4, in which two main carriages 3, 3a are provided, the switches 43 and 45 and the switches 43a and 45a are connected in parallel so that all four switches 45, 43, 45a, 43a must be operated to stop the low speed motors 6, 6a.

It will be understood that each of the elements described above, or two or more together, may also find a useful application in other types of sensing apparatus for setting a tool differing from the types described above.

While the invention has been illustrated and described as embodied in an automatic sensing apparatus for setting the cutter of a lathe in an operative position for truing the worn off peripheral surface of a railroad wheel, it is not intended to be limited to the details shown.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Sensing apparatus for setting a tool in an operative position for truing a worn peripheral surface of a wheel having a wheel flange with an unworn circular rim surface on the extremity thereof, comprising, in combination, support means for supporting the wheel for rotation about an axis; carriage means mounted for movement toward and away from said support means and wheel in radial direction; feeler means mounted on said carriage means and including a positioning feeler for sensing said rim surface and control feeler means for sensing said worn peripheral surface; motor means including a high speed motor and a low speed motor for moving said carriage means; electric circiut means connected with said motor means and including first switching means operated by said positioning feeler when engaging said rim surface to stop said high speed motor, and to cause starting of said low speed motor to move said carriage means and control feeler means toward said worn peripheral surface, and second switching means operated by said control feeler means when engaging said worn peripheral surface to stop said second motor and said carriage means; and tool means mounted on said carriage means in a predetermined position relative to said control feeler means so that said tool means is set for working on said worn peripheral surface when said carriage means stops.

2. Sensing apparatus as claimed in claim 1 wherein said peripheral surface has a plurality of annular surface portions defining different angles with the wheel axis; wherein said control feeler means includes a plurality of control feelers positioned on said carriage means to sense said surface portions, respectively, each control feeler being mounted on said carriage means for movement substantially perpendicular to the respective sensed surface portion; and wherein said second switching means include a plurality of switches respectively operated by said control feelers when the same engage the respective surface portion and are displaced by the same, said switch means being connected so that said carriage means is stopped when the last control feeler senses the respective surface portion and operates the respective switch means.

3. Sensing apparatus as claimed in claim 2 wherein said wheel is a railroad wheel having a wheel flange on one side; wherein said annular surface portions are at least partly worn off, and include a rolling surface portion and a wheel flange surface portion; and wherein said control feeler means include two feelers for sensing said rolling surface portion and said flange surface portion, respectively, each feeler cooperating with one of said switch means.

4. Sensing apparatus as claimed in claim 3 wherein said wheel has an unworn surface on said one side adjacent said wheel flange; wherein said feeler means include a lateral positioning feeler for sensing said lateral surface; wherein said electric circiut means include a third switching means operated by sad lateral positioning feeler; and wherein said carriage means include a carriage mounted for movement in axial direction of said wheel, and supporting said lateral positioning feeler for movement toward said lateral surface.

5. Sensing apparatus as claimed in claim 1 wherein said carriage means include a first carriage supporting said tool means and said feeler means and being movable toward and away from said wheel in radial direction of the same, a second carriage movable in axial direction of said wheel and supporting said first carriage for movement, and a third carriage supporting said second carriage for movement in axial direction and being operated by said high-speed motor and said low-speed motor to move toward and away from said wheel; wherein said wheel has an unworn lateral surface surrounded by said circular rim surface adjacent said wheel flange; wherein said feeler means include a lateral positioning feeler mounted on said second carriage for sensing said lateral unworn surface; wherein said motor means include another motor for moving said second carriage in axial direction of said wheel; said first switching means is operated by said positioning feeler when engaging said rim surface to start said other motor and to move said second carriage until said lateral positioning feeler is in engagement with said lateral surface, said lateral feeler operating said first switching means to start said low speed motor for moving said carriage means and control feeler means toward said worn surface.

6. Sensing apparatus as claimed in claim 5 wherein said positioning feeler is elongated in axial direction of said wheel so that said positioning feeler cooperates with said rim sufrace of said wheel flange in axially displaced positions of said second and first carriages.

7. Sensing apparatus as claimed in claim 5 wherein said control feeler means include two control feelers for sensing a rolling surface portion and a flange surface portion of said worn peripheral surface, respectively, wherein said control feelers are mounted on said first carriage; wherein said second switching means include two switch means operated by said two control feelers, respectively; wherein said motor means include a motor for moving said first carriage with said control feelers, and wherein said two switch means are connected in parallel and to said motor of said first carriage so that said first carriage stops when the last feeler senses the respective surface portion.

8. Sensing apparatus as claimed in claim 7 wherein said high-speed motor and said low-speed motor are connected with said third carriage for moving the same together with said second and first carriages, said feeler means and said tool means.

9. Sensing apparatus as claimed in claim 7 wherein said feeler means include a feeler support movably mounting said positioning feeler and said control feeler means, said feeler support being mounted on said first carriage for movement between a retracted inoperative position and an operative position in which said positioning feeler and said control feeler means cooperate with said wheel; and wherein said motor means operate said second and first carriages with said tool means for truing said worn peripheral surface of said wheel while said feeler support is in said retracted inoperative position so that said feeler means do not interfere with said tool means.

10. Sensing apparatus as claimed in claim 1 wherein said carriage means include a main carriage and a tool carriage supported by said main carriage; wherein said high-speed motor and said low-speed motor drive said main carriage; wherein said feeler means are movable between and operative position and a retracted inoperative position; and including a motor for moving said first carriage with said tool means while said feeler means is in said retracted inoperative position; and means for moving said feeler means to said retracted inoperative position while said tool means operate on said worn peripheral surface.

11. Sensing apparatus for setting a tool in an operative position for truing a worn peripheral surface of a wheel having a wheel flange with an unworn circular rim surface, and an unworn lateral surface surrounded by said circular rim surface, comprising, in combination, support means for supporting the wheel for rotation about an axis; carriage means including a first carriage movable in radial direction toward and away from said support means and said wheel, a second carriage supporting said first carriage for movement and being movable in axial direction, and a third carriage supporting said second carriage and being movable in said radial direction toward and away from said support means and said wheel; feeler means including a first positioning feeler mounted on said first carriage for sensing said rim surface, control feeler means mounted on said first carriage for sensing said worn peripheral surface, and a second positioning feeler elongated in axial direction and mounted on said second carriage for sensing said lateral surface; first motor means for moving said first carriage, second motor means for moving said second carriage, and third motor means for moving said third carriage; electric circuit means connected with said motor means and including first switch means operated by said first positioning feeler when engaging said rim surface to stop said third motor means, and to start said second motor means so that said second positioning feeler moves toward said lateral surface, and second switch means operated by said second positioning feeler when engaging said lateral surface to stop said second motor means and to start said third motor means so that said second control feeler means move toward said worn peripheral surface, said control feeler means operating said first switch means to stop said third motor means when said control feeler means engage said worn peripheral surface; and tool means mounted on said first carriage means in a predetermined relative position to said control feeler means and first positioning feeler means whereby said tool means is set for working said worn peripheral surface when said third carriage means stops with said first and second carriage means whereupon said first carriage with said tool means can be operated by said first motor means.

References Cited

UNITED STATES PATENTS 3,177,743   4/1965   Anderson et al.   82—8
3,347,117   10/1967   Luzina et al.   82—8

LEONIDAS VLACHOS, Primary Examiner